United States Patent [19]

Dessertine

[11] Patent Number: 5,016,172
[45] Date of Patent: May 14, 1991

[54] PATIENT COMPLIANCE AND STATUS MONITORING SYSTEM

[75] Inventor: Albert L. Dessertine, Flemington, N.J.

[73] Assignee: Ramp Comsystems, Inc. Flemington, N.J.

[21] Appl. No.: 457,175

[22] Filed: Dec. 26, 1989

Related U.S. Application Data

[63] Continuation-in-part of Ser. No. 365,933, Jun. 14, 1989.

[51] Int. Cl.⁵ ............................................. G06F 15/42
[52] U.S. Cl. ............................................. 364/413.02
[58] Field of Search .................. 177/25.19, 45.50; 364/413.02

[56] References Cited

U.S. PATENT DOCUMENTS

| | | | |
|---|---|---|---|
| 4,223,801 | 9/1980 | Carlson | 221/3 |
| 4,616,316 | 10/1986 | Hanpeter et al. | 364/413.02 |
| 4,803,625 | 2/1989 | Fu et al. | 364/413.02 X |
| 4,839,806 | 6/1989 | Goldfischer et al. | 364/413.02 |
| 4,933,873 | 6/1990 | Kaufman et al. | 364/413.02 X |
| 4,942,544 | 7/1990 | McIntosh et al. | 364/413.02 X |

Primary Examiner—George H. Miller, Jr.
Attorney, Agent, or Firm—Kenneth P. Glynn

[57] ABSTRACT

The present invention is directed to a method of monitoring a patient's medicine compliance. It involves utilizing an automatic compliance monitoring device which stores compliance information and which may be connected to a computer with a display unit. The compliance monitoring device or the computer is programmed to calculate compliance requirements of the container e.g. by number of cap openings, by dispensing count or by weight information obtained by the automatic compliance monitoring device, for each dosage administration for the prescription period. The automatic compliance monitoring device is periodically, occasionally or randomly connected to the computer to compare actual usage with compliance required to determine compliance results on the display unit to permit compliance monitoring on a monitor at a remote location. Optionally, other patient characteristics are also monitored and feedback is provided. The present invention includes both the method and the system of interconnected devices to practice the method. Feedback may be to any professional or any remote location, and a single medicine or a plurality of medicines may be monitored.

20 Claims, 2 Drawing Sheets

PATIENT COMPLIANCE AND STATUS MONITORING SYSTEM

This application is a Continuation-In-Part application of Copending application Ser. No. 07/365,933 which was filed on June 14, 1989.

BACKGROUND OF THE INVENTION

1. Field of the Invention

The present invention is directed to a method and system for monitoring a patient's compliance with a medicine regimen. It is directed to compliance monitoring by a professional such as a pharmacist, doctor, hospital, clinic or the like at a location remote from the patient. The present invention involves the use of one or more automated compliance monitoring devices and computers for monitoring, and optionally includes monitoring of other patient status information such as physical characteristics, e.g. heart rate, blood pressure, etc. and/or treatment program compliance such as physical therapy or exercise regimens.

2. Prior Art Statement

The use of precision, automatic compliance monitoring devices, unique programming, and remote computers and linking peripherals to monitor medicine regimen compliance has not been taught in the prior art.

U.S. Pat. No. 4,577,710 issued to Edward Ruzumno is directed to an apparatus for promoting good health which involves a personal weight scale and an information and message center which may be used merely for weight control or may be used for specific messages pertaining to a health condition with pretaped feedback from a physician. This recently issued patent represents the concept of patient weight monitoring for general or specific health purposes. However, it does not pertain to medicine regimen compliance, automatic compliance moitoring devices or computer linking as in the present invention.

Most recently, *Time Magazine*, June 5, 1989, at page 70 reported that Aprex, a California Company, has developed a medicine bottle with a computer chip in the cap that records the day and time each time the cap is opened (for taking medicine). The doctor will, at a later visit, put the cap into an electronic analyzer that lets the doctor know how regularly the medicine was taken. This automatic compliance monitoring system, unfortunately, does not permit the doctor or pharmacy to monitor unless the cap is delivered to the analyzer.

SUMMARY OF THE INVENTION

The present invention is directed to a method of monitoring a patient's medicine compliance. It involves utilizing an automatic compliance moitoring device which stores compliance information and which may be connected to a computer with a display unit. The compliance monitoring device or the computer is programmed to calculate compliance requirments of the container e.g. by number of cap openings, by dispensing count or by weight information obtained by the automatic compliance monitoring device, for each dosage administration for the prescription period. The automatic compliance monitoring device is periodically, occasionally or randomly connected to the computer to compare actual usage with compliance required to determine compliance and the computer visually displays the compliance results on the display unit to permit compliance monitoring on a monitor at a remote location. Optionally, other patient characteristics are also monitored and feedback is provided. The present invention includes both the method and the system of interconnected devices to practice the method. Feedback may be to any professional or any remote location, and a single medicine or a plurality of medicines may be monitored.

BRIEF SUMMARY OF THE DRAWINGS

The present invention, its advantages and objects will be more fully understood when the specification herein is taken in conjunction with the appended drawings hereto, wherein.

DETAILED DESCRIPTION OF THE INVENTION

The present invention involves both a method and a system for monitoring a patient's compliance with regard to adhering to a particular medicine regimen. It is directed to compliance monitoring by someone at a remote location, e.g. by a relative or friend or paid service or by a professional such as a pharmacist, a doctor, a physical therapist, a chiropractor or the like or by a hospital or clinic or staff of a convalescence home or any combination of these. Thus, the present invention involves remote monitoring independent from the patient. Further, the invention involves using one or more automatic, compliance monitoring devices and one or more computers which are uniquely interconnected. Further, optional status of patient health characteristics may be monitored in addition to medicine regimen computer tracking, feedback and other communication may be included. Thus, a patient's heart rate, blood pressure, glucose level, cholesterol level, weight, or other physical characteristics may be monitored or some compliance with a physical therapy program or exercise program may be monitored in addition to the medicine regimen monitoring.

The "automatic, compliance monitoring device" described herein is meant to be any known or to be developed device connected to a medicine container—pill, capsule, liquid, or otherwise—which tracks (recognizes and stores) data pertaining to actual medicine consumption container usage. "Actual medicine consumption" means actual amount of medicine taken from a medicine container. Such devices may include cap opening counting devices such as the Aprex device described in the prior art above, or automatic pill counting devices or weight or volume tracking devices connected to a container. The details of the workings of such devices are now within the skill of the artisan and variations may be made without exceeding the scope of the invention.

Figure 1:
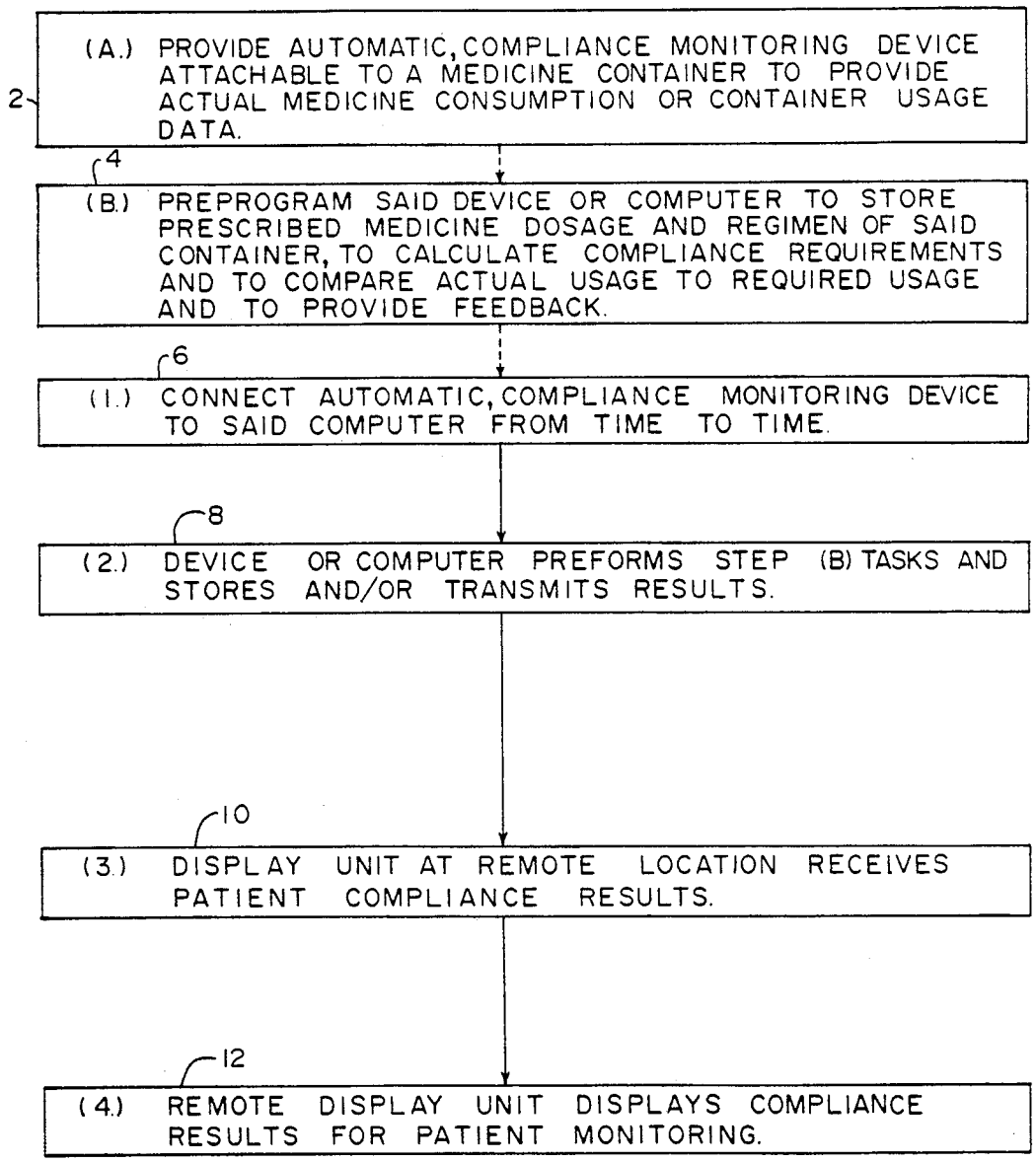
FIG. 1 illustrates a diagramatic representation of some preferred embodiments of the present invention; and, FIG. 2 illustrates a schematic diagram of the present invention showing the interrelationships of the various components.

Referring now to FIG. 1, there is shown a flow diagram with steps (A) and (B) shown which involve preparing the system for using the method of the present invention as well as steps 1 through 4 which show an embodiment involving the steps of the present invention. Thus, frame 2 shows step (A) wherein an automatic, compliance monitoring device attachable to a medicine container may be connected to a computer using the necessary hardware for signal conversion.

Thus, any automatic, compliance monitoring device which is capable of accurately, electronically determining or recognizing medicine consumption and/or container usage data and recording and storing same may be adapted for plugging into a computer. The computer may be active or passive, i.e. do significant work with the data or simply convert it so it may be transmitted to and displayed on a remote display unit. Thus, for example, the device may be used to generate a signal which may be amplified and then converted from analog to digital using a state of the art analog digital converter and then the signal would be used to perform compliance calculations on the computer. Additionally, frame four of FIG. 1, step (B) involves the preprogramming of the device or the computer to store prescription requirements, to recognize various information such as indicated and to determine or calculate compliance requirements and to compare these to actual data. The system may involve storing sequential information e.g. dosage frequency data, so as to determine a required regimen and to compare actual usage against the required usage on a periodic basis or at random times, and to provide feedback. Having thus preprogrammed the device and/or the computer to perform these functions as well as optional functions described below, the system may now be used to practice the method of the present invention.

Referring again to FIG. 1, frame 6 shows the first step 1 wherein an automatic, compliance monitoring device 1 from a medicine container is connected to said computer from time to time. As used herein "from time to time" may be after each dosage is taken, or at set intervals or at random intervals. Frame 8 shows the second step wherein the device or computer performs the functions preprogrammed per step (B), frame 4, discussed above. The computer recognizes the difference between the actual data and the dosage requirements of a patient after it calculates the required usage based on the dosage amount and frequency. Frame 10 shows the third step wherein a remote display unit receives the results of the compliance comparison, and frame 12 shows the fourth step wherein the computer displays compliance results for patient monitoring at a remote location.

As can be seen, the computer used in the present invention may be any conventional computer system and may be interlinked by way of modem or radio transmission or any other computer linking possibilities. Likewise, a sensitive digital or analog scale could be used and the choice of particular equipment would be within the purview of the artisan.

Figure 2:
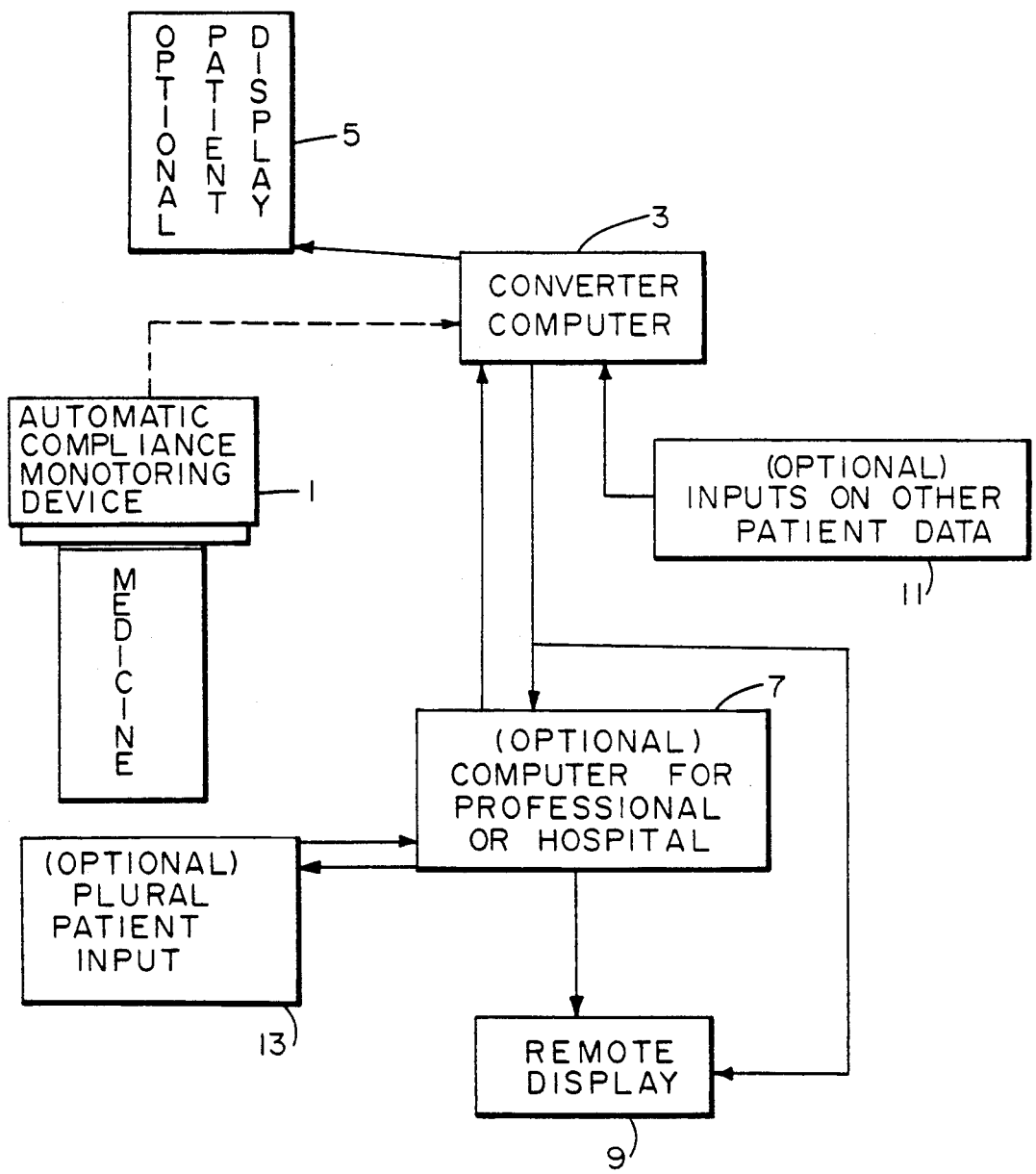

Referring now to FIG. 2, there is shown a container with an automatic, compliance monitoring device 1 which is connected to converter/computer 3 which is in turn connected to remote display unit 9. Additionally, converter/computer 3 is connected to an optional, remote computer for professional or hospital use shown as 7 and when utilized this is connected to remote display unit 9. Optionally, inputs on other patient data may be fed into converter/computer 3 and these optional inputs are shown as block 11. Also, optional patient display unit 5 may be connected to the system for automatic feedback and/or instructions from a professional who is monitoring the patient's medicine regimen. Further, if a professional or hospital is monitoring patient's medicine regimen, then computer 7 and remote display unit 9 may be interconnected with a plurality of other patient inputs 13 and thus professionals may sequentially or randomly monitor a plurality of patients with the same system. This may be beneficial for convalescent homes, cancer treatment centers, rehabilitation centers and the like where patient progress and medicine regimen may be monitored from a single computer station.

In one preferred embodiment of the present invention, the medicine taker or user of the system is requested to input with the device to the computer each time the medicine is taken. Thus, in this embodiment, the expression relating to providing input from the device to the computer "from time to time" refers to each time it is used. In this manner, optimum monitoring is achieved so that if there is an overdosage or a missed dosage, the present invention system will alert the user, or a professional or both of the deficiency or overdosage. Additionally, the system may, as mentioned, be used to provide monitoring for more than one medication at a time. This may be done by including an optional scanner whereby the compliance monitoring device for each medication has a code which is read by the scanner and properly identified by the computer before the computer calculates and compares actual and required dosages. Alternatively, the user may punch in or feed into the computer identification for each medicine. Alternatively, other ways of discerning advice for one medication from another may be included without exceeding the scope of the present invention.

In another preferred embodiment of the present invention, the system is used to also monitor heart rate, blood pressure, glucose, cholesterol, blood cell count, respiration, body weight or other physical characteristic or characteristics and these may be monitored by the patient or by a professional. Further, or in addition to the foregoing, the system may be used to also monitor compliance with a physical regimen such as a physical exercise program or a physical therapy program. This may be done by having a user active system wherein the user must feed in information to the computer each time an exercise or a therapy session occurs, or the system itself may be interlinked with actual exercise equipment such as treadmills, exercise bicycles, rowing machines, weight pulls, etc. and direct information from the exercise equipment will be communicated to the computer and subsequently to the monitor to assure compliance by the patient.

In any of the above embodiments, the present invention in its more refined embodiment may include computer recognition and feedback of actual times and dates for every required dosage (specific day and/or time of day) and for every actual dosage removed from the medicine container. In other words, the system will provide the patient and/or professional with output showing actual versus required usage on a time based dosage comparison. When this mode is utilized the computer will be provided with necessary information to generate requirements and the patient may input the computer with data from the compliance monitoring device of the medicine container at each use of the medicine container.

While the computer described above is generally preprogrammed to receive data from the automatic, compliance monitoring device and to process that data, the computer may be more complex or less complex without exceeding the scope of the present invention. For example, the computer may be mearly a unit that reads electronic information provided to it and converts it for transmission to a display unit. Alternatively, the computer may include any or all of the previously mentioned comparison and reporting functions and optional functions and may also include means for a patient to provide subjective of information back to a hospital or doctor such as how the patient feels or how the patient is responding to the medication.

Obviously, numerous modifications and variations of the present invention are possible in light of the above teachings. It is therefore understood that within the scope of the appended claims, the invention may be practiced otherwise than as specifically described herein.

What is claimed is:

1. A method of monitoring a patient's medicine compliance, which comprises:
   (a) providing an automatic, compliance monitoring device, which device automatically tracks at least one type of data related to actual medicine consumption or container usage, said device being connectable to a medicine container;
   (b) from time to time, connecting said device to a computer to input the actual medicine consumption or container usage data;
   (c) having either said device or said computer programmed to store the prescribed medicine dosage and regimen of said container;
   (d) having either said device or said computer programmed to calculate compliance requirements for each dosage administration for the prescription period of the medicine and for comparing the actual medicine consumption or container usage with the compliance requirements;
   (e) connecting said computer to a display unit at a remote location away from the automatic compliance monitoring device; and,
   (f) visually displaying the compliance results on said display unit to permit compliance monitoring.

2. The method of claim 1 wherein two computers are used, a first computer being located so as to be readily available to receive actual data from said automatic, compliance monitoring device and a second being remotely located with said display unit.

3. The method of claim 2 wherein said first computer includes a display unit to provide corrective instructions to a patient when appropriate.

4. The method of claim 3 wherein said computer is programmed to provide specific day and/or time of day information to display compliance information to a patient on its display unit.

5. The method of claim 4 wherein said remote communication is to a professional for compliance monitoring.

6. The method of claim 5 wherein said professional has a computer/display unit with the capability of screening different patients as desired.

7. The method of claim 6 wherein said computer/display unit of said professional is programmed to and connected to a patient's display unit to permit the professional to give instructions to said patient.

8. The method of claim 1 wherein said remote communication is to a professional for compliance monitoring.

9. The method of claim 1 wherein the method is repeated for a plurality of different containers of medicine with different automatic compliance monitoring devices and the computer determines and stores compliance information for each of said plurality of different devices.

10. The method of claim 1 wherein said method further includes monitoring one or more of a patient's medical characteristics to provide supplemental patient information to the computer.

11. The method of claim 10 wherein said patient medical characteristics include detailed physical regimen results taken from patient exerciser therapy equipment.

12. The method of claim 10 wherein said one or more patient medical characteristics is one or more vital signs.

13. The method of claim 12 wherein said medical characteristics are selected from one or more of heart rate, blood pressure, glucose, cholesterol, blood cell count, respiration or body weight.

14. A system for patient medicine compliance and patient status monitoring, which comprises:
   (a) at least one automatic, compliance monitoring device which automatically tracks at least one type of data related to actual medicine consumption or container usage, said device being connected to a medicine container;
   (b) a computer, connectable to said device to receive input from said device on actual medicine consumption or container usage; and,
   (c) a display unit connected to said computer and remotely located away from said computer and automatic, compliance monitoring device to permit compliance monitoring of a patient at a location remote from said patient;

Further, wherein either said device or said computer is programmed to store prescribed medicine dosage and regimen of said container and having either said device or said computer programmed to calculate compliance requirements for each dosage administration for the prescription period and for comparing the actual medicine consumption or container usage with the compliance requirements to display comparison results on said remote display unit.

15. The system of claim 14 wherein two computers are included, a first computer being located so as to be readily available to said automatic, compliance monitoring device, and a second being remotely located with said display unit.

16. The system of claim 15 wherein said first computer also includes a display unit to provide corrective instructions to a patient.

17. The system of claim 14 wherein said computer is further capable of performing for a plurality of automatic, compliance monitoring devices from a plurality-containers of medicine.

18. The system of claim 14 wherein said remote display unit is located at a professional and said professional has a computer/display unit with the capability of screening different patients as desired.

19. The system of claim 18 wherein said computer/display unit of said professional is programmed to and connected to a patient's display unit to permit the professional to give instructions to said patient.

20. The system of claim 14 which further comprises means for monitoring patient medical characteristics which comprises a conversion device which converts medical testing or monitoring equipment signals to computer signals and means for transmitting converted signals to said computer for processing and displaying on said display unit.

* * * * *